United States Patent [19]
Hladik et al.

[11] Patent Number: 5,465,271
[45] Date of Patent: Nov. 7, 1995

[54] POST DETECTION WEIGHTED VECTOR COMBINING DIVERSITY RECEIVERS USING PHASE METRICS FOR MOBILE AND INDOOR RADIO CHANNELS

[75] Inventors: Stephen M. Hladik, Albany, N.Y.; Sandeep Chennakeshu, Cary, N.C.

[73] Assignee: General Electric Company, Schenectady, N.Y.

[21] Appl. No.: 109,553

[22] Filed: Aug. 20, 1993

[51] Int. Cl.[6] .................................... H04B 7/02; H04L 1/02
[52] U.S. Cl. .......................... 375/267; 375/325; 375/331; 375/347; 329/304; 455/137
[58] Field of Search ..................................... 375/267, 325, 375/330–332, 341, 347; 329/304; 455/52.1, 65, 137–139; 342/380, 383

[56] References Cited

U.S. PATENT DOCUMENTS

| | | | |
|---|---|---|---|
| 5,001,724 | 3/1991 | Birgenheier et al. | 329/304 |
| 5,187,719 | 2/1993 | Birgenheier et al. | 375/261 |
| 5,255,290 | 10/1993 | Anvari | 375/344 |

OTHER PUBLICATIONS

"Linear Diversity Combining Techniques" by D. G. Brennan, pp. 1075–1102, proceedings of the IRE, Jun. 1959.
"A Power–Spectral Theory of Propagation in the Mobile–Radio Environment" by M. J. Gans, IEEE Transactions on Vehicular Technology, vol. VT–21, No. 1, pp. 27–38, Feb. 1972.
"A Fully Digital Hardware Detector for p/4 QPSK" by C. P. LaRosa, M. J. Carney, Proceedings of the 42nd IEEE Vehicular Technology Conference, May 1992, pp. 293–297.

*Primary Examiner*—Young Tse
*Attorney, Agent, or Firm*—Lawrence P. Zale; Marvin Snyder

[57] ABSTRACT

A digital radio communications system employs a digital information source for providing digital information such as message bits, a transmitter for transmitting encoded digital information into data symbols in a radio-frequency (RF) signal to a plurality of antennae which sense the transmitted RF signal. A post detection measure of signal quality, the signal-to-impairment ratio, (SIR), is utilized by the receiver to perform post detection combining of signals received by a plurality of antennae. The antennae are coupled to a receiver which for each received signal: digitizes the signal, determines phase angles of the digitized signal, converts the signal to unit vectors, determines a signal-to-impairment ratio (SIR) estimates $\hat{\gamma}$ of the digitized signals. The SIR estimate $\hat{\gamma}$ is weighted by combining weight computation element and multiplied by each unit vector to provide an in-phase is component and a quadrature component for each signal. The in-phase components are combined into a in-phase composite signal $I_c(n)$. The quadrature-phase components are combined into a quadrature-phase composite signal $Q_c(n)$. The composite signal $(I_c(n), Q_c(n))$ is then decoded into phase angles which are reversed mapped to message bits which are utilized by an output device resulting in a radio communication system exhibiting improved performance during radio "fade" periods.

11 Claims, 2 Drawing Sheets

POST DETECTION WEIGHTED VECTOR COMBINING DIVERSITY RECEIVERS USING PHASE METRICS FOR MOBILE AND INDOOR RADIO CHANNELS

CROSS REFERENCES TO RELATED APPLICATIONS

This application is related to U.S. patent applications "Channel State Information From Received Signal Phase Angles" by S. Chennakeshu, R. Koilpillai and R. Toy Ser. No. 08/109,555, filed Aug. 20, 1993; "Post Detection Selection Combining Diversity Receivers for Mobile and Indoor Radio Channels" by S. Chennakeshu, S. M. Hladik, G. Sattinier, R. Koilpillai and R. Toy Ser. No. 08/109,556, filed Aug. 20, 1993, now U.S. Pat. No. 5,351,274 and "Adaptive Phase-locked Loop Employing Channel State Information From Received Signal Phase Angles" by S. Chennakeshu, R. Koilpillai and R. Toy Ser. No. 08/109,554, filed Aug. 20, 1993, now U.S. Pat. No. 5,406,593 all assigned to the present assignee and hereby incorporated by reference.

BACKGROUND OF THE INVENTION

1. Field of the Invention

This invention relates to mobile radio systems and more specifically to transmitting, receiving and demodulating digital information in a radio system.

2. Description of Related Art

In digital mobile radio systems, base units communicate with a plurality of mobile radio units. A transmitter of one of the communicating units transmits symbols embedded in a continuous radio-frequency (RF) signal allowing a receiver to decode the RF signal into digital information.

Channel impairments such as RF interferences, radio signal "fades", thermal receiver noise, and other RF distortion may cause errors in the detected message.

Often in ground-based communications, transmitted radio signals are reflected from physical objects and arrive at the receiver's antenna via paths of different lengths. Movement of either transmitter or receiver causes these paths to change constantly. Signals received from paths of different lengths arrive at slightly different times and, therefore, are sometimes out of phase. This is known as multi-path propagation. During multi-path propagation, the signal received by the mobile receiver exhibits time-varying signal strength as the mobile receiver moves through a standing wave field pattern. Alternatively, a mobile transmitter can cause a fixed receiver to receive a time varying field, which is also dependent upon the relative locations of the antennae.

Land mobile studies have found that the strength of signals received by antennae that are spatially separated by a distance of one quarter wavelength of the carrier frequency or more, are essentially uncorrelated. This property is the basis for the use of antenna diversity to improve the performance of land-based mobile radio systems.

In order to improve signal quality, a number of antennae have been connected to a receiver, and the signal from the antenna having the best quality is decoded. This is referred to as antenna diversity employing selection combining (SC). The receiver monitors the signal quality of each of the antennae, and periodically selects the signal of greatest quality, while ignoring the signals from other antennae.

"Linear Diversity Combining Techniques" by D. G. Brennan, pages 1075–1102, proceedings of the IRE, June 1959 discloses the use of maximal and ratio combining (MRC). Brennan discloses that combining of the signals with weighting factors proportional to their root mean square voltage results in a composite signal having the maximal signal to noise ratio. However, predetection maximal power ratio combining methods require signal envelope information and co-phasing of the signals from all of the antennae. Accurate co-phasing of fading signals from different antennae is a difficult task. Also, estimation of the signal envelope requires increased receiver complexity.

Currently there is a need for a simplified radio system which does not require signal co-phasing and signal envelope information.

OBJECTS OF THE INVENTION

An object of the present invention is to provide a simplified communication system which is resistant to radio signal fades.

Another object of the invention is to provide a communication system exhibiting improved system performance in fading channels as compared with prior art radio systems.

Another object of the invention is to provide a communication system requiring reduced transmitted power to achieve a designated performance in fading channels as compared with prior art radio systems.

Another object of the invention is to provide portable mobile radios requiring reduced transmitted power to achieve a designated performance in fading channels as compared with prior art radio systems.

Another object of the invention is to provide a communication system employing a simplified receiver being less complex for the same performance as compared with conventional radio systems.

SUMMARY OF THE INVENTION

A digital communication system comprises a digital information source for providing data symbols to be transmitted, a transmitter for transmitting data symbols in a digital radio-frequency (RF) signal, a plurality of antennae for sensing the RF signal and a plurality of receiver branches.

In each receiver branch, a front end unit heterodynes the received signal down to an intermediate frequency (IF) signal which is then further down converted to a stream of baseband signal samples. A phase detector calculates a stream of symbol phase angles from the baseband signal samples. The symbol phase angles are converted to unit-amplitude vectors by a vector converter. A signal-to-impairment ratio (SIR) estimator determines the signal quality from the symbol phase angles. The unit amplitude vectors are weighted by a combining weight computation element as a function of their respective SIRs and added. The weighted SIRs from each receiver branch are combined to produce a composite symbol phase angles. Symbol decisions are then performed by a decision device based on these composite symbol phase angles. The present invention provides improved diversity signal detection without requiring signal envelope or co-phasing information.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

Figure 1:
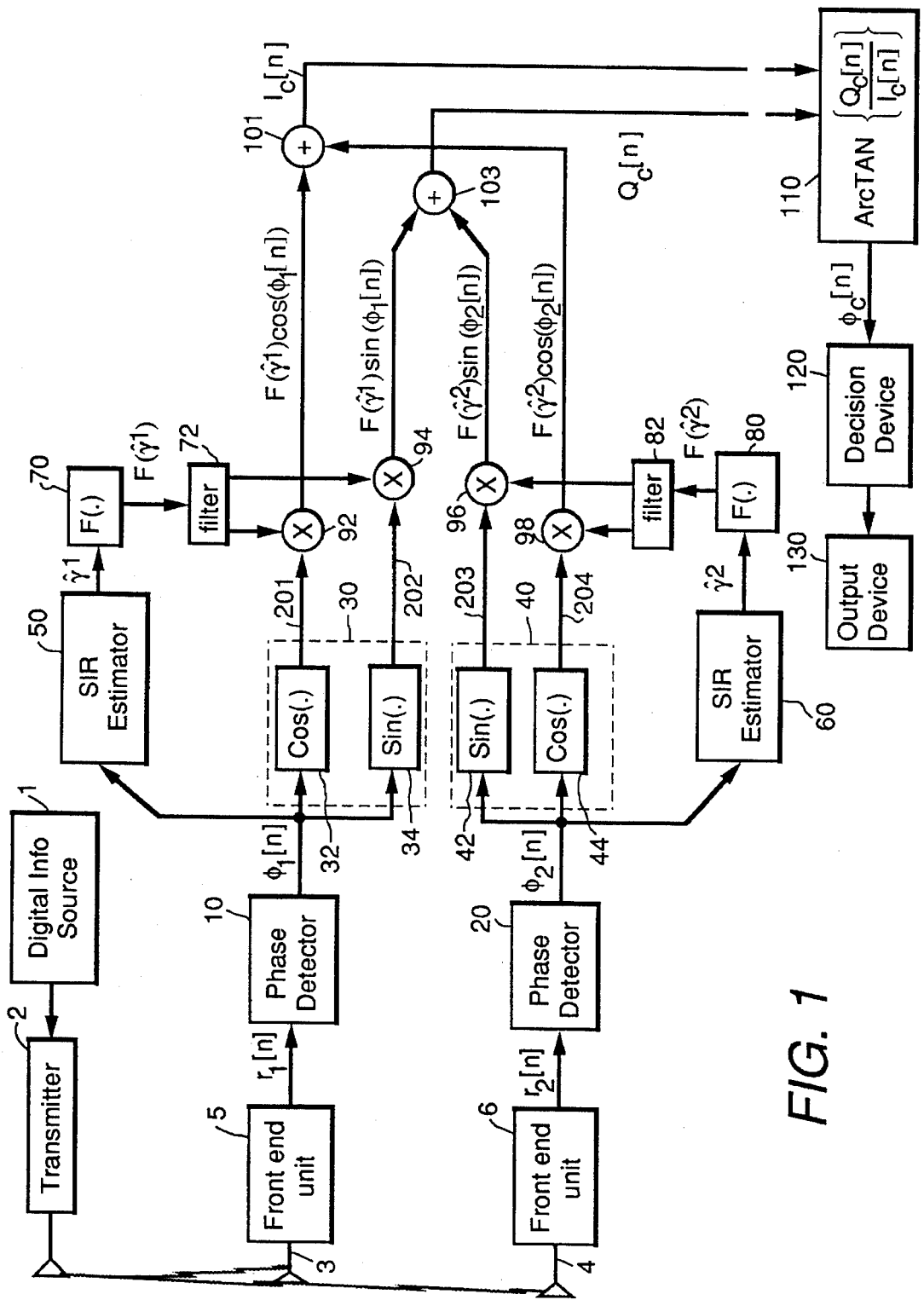
FIG. 1 is a simplified block diagram of a digital communication system according to the present invention.

In digital radio systems, data from a digital information source is encoded as symbols in a transmitter and transmitted in a radio-frequency (RF) signal to an antenna which senses the RF signal. A receiver coupled to the antenna receives the sensed signal and decodes it into data. The decoded data may be different from the transmitted data due to impairments which affect the transmitted signal. One such type of impairment is a signal "fade". This is a temporary reduction in signal strength due to the multi-path propagation and motion of the transmitter or receiver. In mobile radio systems it is common that objects, such as buildings, cars, pavement and trees reflect the signal transmitted such that signal fading occurs at the antenna of the receiver.

For instance, in the U.S digital cellular system, when a vertical monopole antenna is used at a carrier frequency of 900 MHz and vehicle speed of 100 Kmph, it can be shown that an average duration of a fade that is 20 dB below the reference signal level is approximately 482 microseconds as described in "A Power-Spectral Theory of Propagation in the Mobile-Radio Environment" by M. J. Cans, IEEE Transactions on Vehicular Technology, Vol. VT-21, No. 1, pp. 27–38, February 1972. For a data rate of 48.6 Kbps and π/4-shifted differentially encoded quadrature phase shift keying (DQPSK) modulation. The above fade duration spans 12 symbols.

Since received signal strength is a function of antenna location, it is advantageous to receive signals at spatially separated antennae, and properly combine them to create an improved signal.

A technique of employing a number of antennae at different locations and a receiver which selects the best received signal from the antennae is known as antenna diversity with selection combining (SC). This is a well-known technique used to reduce the transmitted power required for communication over fading channels. If the antennae are sufficiently spaced, the received signals are uncorrelated. The received signals' envelopes are typically used to choose the signal having the largest level.

The received signal r(t) at any antenna may be described as:

$$r(t)=s(t)+n(t)+i(t) \tag{1a}$$

where n(t) is the thermal noise of the equipment which may be modeled as additive white Gaussian noise (AWGN);

i(t) is interference in the channel which may be due to intersymbol interference and multipath propagation echoes; and s(t) is the true signal.

The received signal r(t) in a jth antenna can also be expressed as:

$$r_j(t)=A(t)\cos(\omega_c t+\theta(t))+B_j(t)\cos(\omega_i t+\psi(t))+n_j(t) \tag{1b}$$

where

A(t)=instantaneous envelope, $\omega_c$=carrier frequency,

θ(t)=instantaneous transmitted phase, $B_j(t)$=composite instantaneous envelope of the interfering signals in the jth receiver, $\omega_i$=carrier frequency of the interference, ψ(t)=instantaneous phase of the composite interfering signal, and $n_j(t)$=additive white Gaussian noise process in the jth receiver.

A predetection measure of the signal-to-noise ratio (SNR) obtained from the received signal is:

$$\frac{1}{\tau}\int_{t-\tau}^{t}\frac{|s(t)+i(t)+n(t)|^2 dt}{N_0 B_n} \tag{2}$$

where $N_0$ is power spectral density of the thermal noise and $B_n$ is the equivalent noise bandwidth of the IF filter. Generally, $N_0 B_n$ is a known constant for a given receiver. Therefore, $$\frac{1}{\tau}\int_{t-\tau}^{t}|s(t)+i(t)+n(t)|^2 dt \tag{3}$$

known as received signal strength (RSS), is used as the SNR metric in land mobile radio receivers.

Eqs. (2) and (3) are effective in determining SNR when the actual signal s(t) is much greater than the noise n(t) and the interference i(t). However, during "fades", this signal-to-noise ratio estimate is poor. A second drawback is that SNR as measured above does not indicate the degradation in received signal quality due to interference.

For signaling methods in which information is carried in the signal's phase, it is common to utilize limiting amplifiers in the receiver. This restricts the diversity techniques that are applicable to selection combining. However, D. G. Brennan has described in "Linear Diversity Combining Techniques", Proceedings of the IRE, pp. 1075–1102, June 1959 that maximal ratio combining (MRC) antenna diversity results in greater performance improvement in fading channels than SC antenna diversity. Brennan's method, along with other known MRC methods, requires signal envelope and amplitude information. Since the receiver must obtain signal envelope and amplitude information to select and weight signals to be combined, additional signal processing is necessary. This increases the delay associated with demodulation and decoding and causes the receiver to be slower, or become more costly and complex.

The present invention employs a channel state information (CSI) metric described in U.S. patent application "Post Detection Selection Combining Diversity Receivers for Mobile and Indoor Radio Channels", Chennakeshu, Hladik, Saulnier, Koilpillai, Toy Serial No. 08/109,556, filed: Aug. 20, 1993, now U.S. Pat. No. 5,351,274, filed concurrently with this application to perform post detection selection diversity. A monotonic function of the estimated CSI metric is used to weigh the signals for post detection combining. Specifically, this channel state information (CSI) metric is an estimation of a signal-to-impairment power ratio (SIR) from the detected phases of the received signals. The SIR is a measure of received signal quality. It is the ratio of received signal power to impairment power defined below.

$$SIR \overset{\Delta}{=} \frac{S}{I+N} \quad (4)$$

where S is the signal power, I is the interference power, and N is the noise power.

The impairments include thermal noise and data noise caused by the characteristics of the channel (intersymbol interference) along with multipath propagation (echoes).

In a digital radio systems according to the present invention, as shown in the simplified block diagram of FIG. 1, message bits from a digital information source 1 is encoded as data symbols in a transmitter 2 and transmitted in a radio-frequency (RF) signal to be received by a plurality of antennae 3, 4, ... which sense the transmitted RF signal, each being part of a plurality of receiver branches. (Only two antenna and receiver branches are shown, but any number may be used with diminishing return being exhibited by each additional antennae and receiver branch.) Antennae 3, 4 are coupled to front end units 5, 6 which heterodyne the signals received by antennae 3, 4 into baseband signals and then generates a stream of samples $r_1(n)$, $r_2(n)$.

Phase detectors 10, 20 are either a coherent or a differential detector, depending on the communication system's modulation scheme. They provide a decoded phase angle $\phi_1(n)$, $\phi_2(n)$ that corresponds to the nth transmitted symbol. Vector converters 30, 40 (enclosed by dashed lines in FIG. 1) convert the decoded phase angles $\phi_1(n)$, $\phi_2(n)$ to unit-magnitude vectors in cartesian form. An SIR estimator 50, 60 determines SIRs $\hat{\gamma}^1$, $\hat{\gamma}^2$ for decoded phase angles $\phi_1(n)$, $\phi_2(n)$, respectively.

A maximum likelihood (ML) estimate of SIR is calculated by SIR estimator 50, 60 according to:

$$\hat{\gamma}_n^j = \frac{1}{2\sin^2(\theta(n) - \phi_j(n))} \quad (5)$$

where $\phi_j(n)$ is the instantaneous phase of the signal received by antenna j at time t=nT;

T is the symbol period;

$$\theta(n) = \min_i \{\theta_i(n) - \phi_j(n)\}$$

$\theta_i(n)$ is a phase angle from the set of possible symbol constellation phase points (angles) transmitted $\{\theta\}$ that minimizes the absolute difference between $\theta_i(n)$ and $\phi_j[n]$.

If differential detection is employed in the apparatus of FIG. 1, the ML estimate of SIR becomes:

$$\hat{\gamma}_n^j = \frac{1}{2\sin^2(\theta(n) - \phi_j(n))}, \quad (6)$$

where $$\Delta\theta(n) = \theta(n) - \theta(n-1)$$

and $$\Delta\phi_j(n) = \phi_j(n) - \phi_j(n-i)$$

Improved ML estimates of the SIR may be obtained by averaging or filtering of the instantaneous SIR metrics of Eqs. (5) and (6) over several symbol periods.

Combining weight computation element 70, 80 provide the appropriate combining weight $F(\hat{\gamma}^1)$, $F(\hat{\gamma}^2)$ to be applied to signals 201, 202, 203, 204 which are the outputs of the phase to unit vector convertors 30 and 40. A first embodiment of the present invention employs an estimate of the detected signals' SIRs $\hat{\gamma}^1$, $\hat{\gamma}^2$ as the combining weights. That is, $F(\hat{\gamma})$ is simply equal to $\hat{\gamma}^j$.

Combining weight computation element 70, 80 in alternate embodiments can be any monotonic (and possibly nonlinear) function. For example, if the function $F(\hat{\gamma}^j)$ is a square root operation, then the post detection weighted vector combining scheme described in FIG. 1 approximates post detection maximal ratio combining.

While the use of $F(\hat{\gamma}^j)$ (a function of the instantaneous SIR) for selection combining yields improvement in a fading channel compared to differential detection alone, the estimate of instantaneous SIR will be noisy. The performance of post detection selection combining can be improved by filtering the selection metric with metric filters 72, and 82, if the noisy symbols are independent from symbol to symbol and the channel is quasi-stationary over the duration of the metric filters impulse response. Let $F(\hat{\gamma}^j(n))$ be a function of the instantaneous SIR metric for the jth receive branch at time nT, where T is the symbol interval and n is an integer. Then, a simple filtered selection metric can be written as:

$$F(\hat{\gamma}_{ave}^j(n)) = \sum_{i=n-L+1}^{n} h(i-n+L-1)F(\hat{\gamma}^j(i)) \quad (7)$$

where h(i) are coefficients of the impulse response of metric filters 72, 82 and L is the length of the impulse response in symbol intervals, chosen to be the average fade duration of the channel.

Eq. (7) represents causal filtering of selection metric $F(\hat{\gamma}^j)$. If signal samples and SIR estimates are stored in memory, the selection metrics can be smoothed by non-causal filtering. This non-causally filtered metric can be expressed as:

$$F(\hat{\gamma}_{ave(nc)}^j(n)) = \sum_{i=n-M}^{n+N} h(i-n+M)F(\hat{\gamma}^j(i)) \quad (8)$$

$$M = \lfloor \frac{L}{2} \rfloor, N = \lceil \frac{L-2}{2} \rceil, \text{ and } \lfloor \frac{L}{2} \rfloor$$

is a floor function representing a largest integer less than L/2; and $$\lceil \frac{L-2}{2} \rceil$$

is a ceiling function representing a smallest integer greater than or equal to $$\frac{L-2}{2}.$$

Multipliers 92, 94 multiply the combining weight $F(\hat{\gamma}^1)$ by unit vector $\{\cos(\phi_1(n)), \sin(\phi_1(n))\}$ from vector converter 30, to 15 produce the weighted in-phase, and weighted quadrature vector components, respectively for the first receiver branch. Similarly, multipliers 96, 98 multiply the combining weight $F(\hat{\gamma}^2)$ by unit vector $\{\cos(\phi_2(n)), \sin(\phi_2(n))\}$, (from vector converter 40) to produce a weighted in-phase, and weighted quadrature vector components, respectively, for the second receiver branch.

Summer 101 sums all in-phase vector components to produce a composite in-phase vector component $I_c(n)$, and summer 103 sums all quadrature vector components to produce a composite quadrature vector component $Q_c(n)$. The composite signal vector may be represented by $I_c(n)+jQ_c(n)$ in complex format.

A composite phase angle $\phi_c(n)$ is computed by an inverse tangent unit 110 described as the inverse tangent of the composite quadrature signal component $Q_c(n)$ divided by the corresponding composite in-phase component $I_c(n)$. The resultant phase angle signal $\phi_c(n)$ is then passed to decision device 120 which determines the most likely corresponding message bits. These detected bits are provided to an output device 130. Output device 130 may be a vocoder which converts the digital information into a signal for any number of digital devices capable of utilizing digital information.

Figure 2:
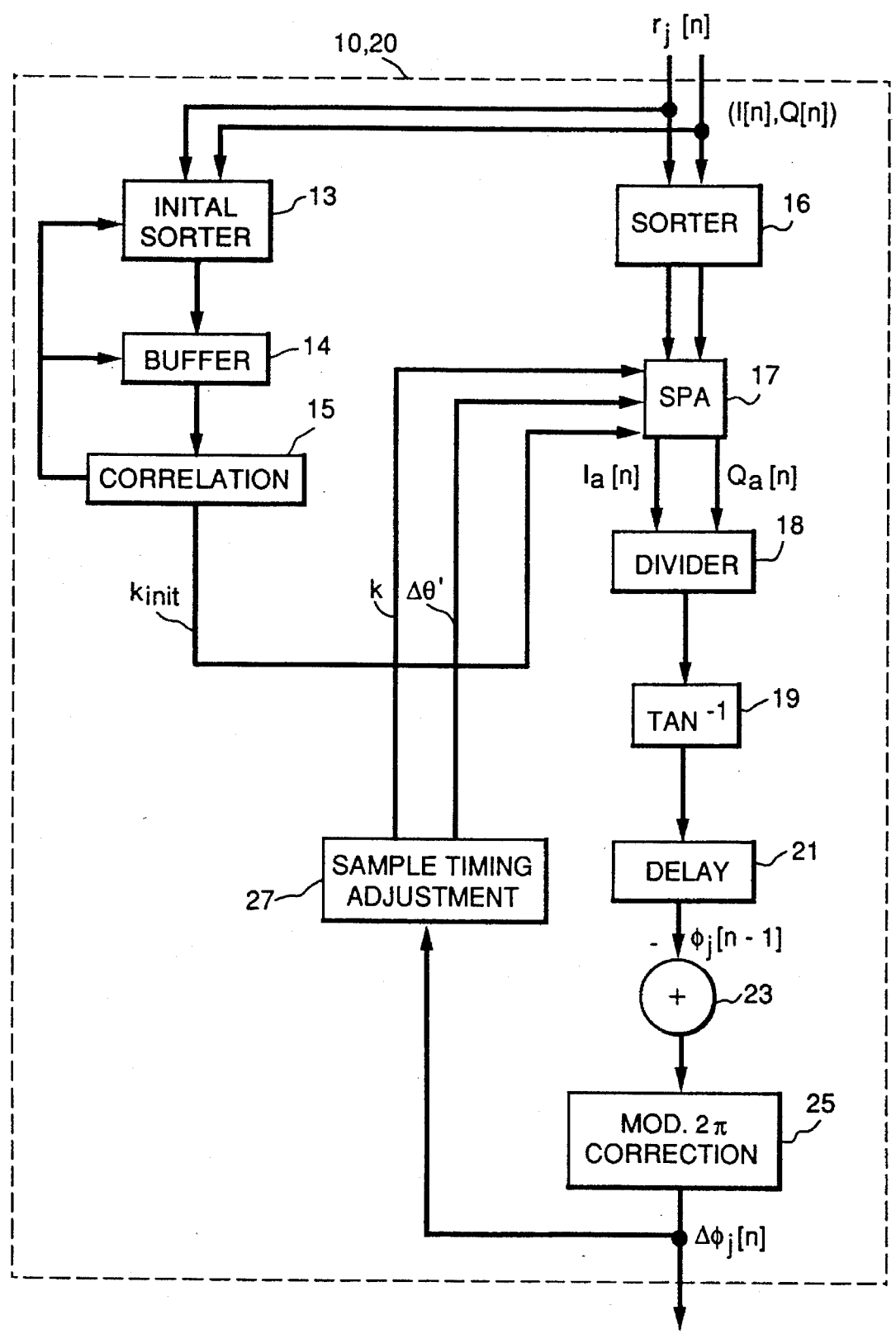
FIG. 2 is simplified block diagram of the phase detectors 10, 20 of FIG. 1 employing integrated symbol timing and frequency offset correction.

FIG. 2 is a simplified block diagram of the down converters and phase detectors 10, 20 of FIG. 1 with integrated symbol timing and frequency offset correction. In this embodiment, the jth phase detector receives a stream of samples $r_j(n)$ from a front end unit with each sample, $r_j(n)$, having an in-phase component $I(n)$ and a quadrature component $Q(n)$.

The phase detector operates by first establishing frame/slot synchronization to find a rough sample index. This is performed by first selecting a number of samples with initial sorter 13 and storing these samples in a buffer 14. A correlation circuit 15 correlates a number of buffered samples pertaining to the length of a preamble with a stored predetermined preamble. The index marking the starting sample from which the received signal was correlated is incremented to the next sample. An appropriate number of symbols are selected, starting from the sample marked by the incremented index. This process of selecting samples and cross-correlating them with the preamble is repeated for several frames until the correlation produces several successive peaks that exceed a certain predetermined threshold. This sample index, $k_{init}$, is assumed to be the beginning of a frame and slot (hereinafter frame/slot). Since the number of samples in a frame is predetermined, the beginning of the next frame can be calculated by incrementing the sample index by the number of samples that are in a frame. The correlation circuit then repeats the correlation process at the new sample index. If the correlation between the known preamble and the received symbols is above a predetermined threshold at this index, it can be assumed that this is the beginning of the next frame. If the correlation between the received symbols and the preamble is below the predetermined threshold, the search is started at the beginning again. If a number of successive correlation peaks are found, the frame/slot synchronization is complete, and the sample index $k_{init}$ is used as a starting point for a fine adjustment known as symbol synchronization.

In symbol synchronization, a sorter circuit 16 processes the sequential string of samples $(I(n), Q(n))$ by retaining a predetermined number of samples and discarding the remaining samples. The samples retained are determined by the sampling index k starting with $k_{init}$. It must be noted that the greater the number of samples discarded, the shorter the processing time but the greater the timing error.

In order to establish sample timing, and estimate carrier frequency offset, a 2-dimensional search is performed to find the sample timing k and phase rotation $\Delta\theta$ (corresponding to the frequency offset between transmitter and receiver phases) that will maximize the measured signal to impairment ratio, as disclosed in U.S. patent application "Tangental Type Differential Detector for Pulse Shaped PI/4-Shifted Differentially Encoded Quadrature Phase Shift Keying" by Chennakeshu, G. Saulnier, Ser. No. 07/703,637, filed May 21, 1991, now U.S. Pat. No. 5,208,815.

The samples $(I(n), Q(n))$ that are retained by sorter circuit 16 for a given sample index k are then selected in pairs and adjusted for any frequency offset by SPA circuit 17. SPA circuit 17 synthesizes a new pair of samples $(I_a(n), Q_a(n))$ from $(I(n), Q(n))$ using an estimated phase adjustment $\Delta\theta_k$.

The divider circuit 18 divides $Q_a(n)$ by $I_a(n)$ to produce an output signal that represents a tangent of the signal phase angle.

Divider circuit 18 acts as a limiter in the detector circuit since it sets the complex envelope of $(Q_a(n), I_a(n))$ sample pair to unity. In the absence of noise divider circuit 18 removes the dependence of the $(Q_a(n), I_a(n))$ samples on the amplitude since the divider output signal represents a ratio.

An inverse tangent circuit 19 receives the signal from divider 18 and produces an output signal representing the received signal's instantaneous phase angle $\phi_j(n)$.

A delay circuit 21 receives the phase angle and delays it until a subsequent symbol's phase angle is decoded. A summer 23 receives a phase angle which has just been decoded $\phi_j(n)$ at the same time it receives the last decoded phase angle $\phi_j(n-1)$, and subtracts $\phi_j(n)$ from $\phi_j(n-1)$ to produce a phase angle difference $\Delta\phi_j(n)$ being the differential phase angle between consecutive symbol time periods.

The differential phase angle signal $\Delta\phi_j(n)$ is then received and processed by a modulo-$2\pi$ correction circuit 25, altering the phase of the signal as follows:

$$\text{IF } \Delta\phi_j(n) < -180° \text{ THEN } \Delta\phi_j(n) = \Delta\phi_j(n) + 360° \quad (9)$$

and $$\text{IF } \Delta\phi_j(n) > -180° \text{ THEN } \Delta\phi_j(n) = \Delta\phi_j(n) - 360° \quad (10)$$

producing a corrected relative phase angle output signal. This correction reduces the BER when successive angles wrap-around the real axis. The need for this correction is explained by the following example: Let $\phi_j(n)=5°$, $\phi_j(n-1)=355°$ and for convenience let $\Delta\theta'=\Delta\theta$. Then, without the modulo-$2\pi$ correction circuit, $\Delta\phi_j(n)=-350°$ when it should be $\Delta\phi_j(n)=10°$. The modulo-$2\pi$ correction circuit removes the wrap-around error.

A sample timing adjustment circuit 27 detects differences between a stored set of reference characters and the decoded phase angle differences $\Delta\phi_j(n)$, and minimizes this difference by adjustments to sample timing k and carrier phase adjustment estimation $\Delta\theta'$. These adjustments are made by performing a two-dimensional search over selected possible sample index selections k and phase adjustment selections $\Delta\theta'$ and by comparing stored reference phases decoded phases to minimize the difference. This process may span transmissions of several sets of reference characters, as also described in U.S. Pat. No. 5,208,815, above.

An advantage of the present invention over conventional diversity receivers is that it can combine signals from antennae according to their SIR derived from received phase angles. As a result, a second advantage is that limiting amplifiers may be used in the receiver's front end, since signal envelope (amplitude) information is not employed in the SIR estimation.

Specifically, the present invention employing post detection WVC diversity is applicable to digital cellular radiotelephone and land mobile radio equipment. There is also a potential application to personal communications systems (indoor and microcellular). The present invention is applicable to wireless or cellular secure telephone units and military radios that must operate over fading channels.

In all of the stated applications, this invention can be applied in base stations to improve system performance and/or reduce the transmitted power required in portable and mobile radios. Moreover, this invention can be applied advantageously in portable radios in several ways.

While several presently preferred embodiments of the present invention have been described in detail herein, many modifications and variations will now become apparent to those skilled in the art. It is, therefore, to be understood that the appended claims are intended to cover all such modifications and variations as fall within the true spirit of the invention.

What we claim is:

1. A fade-resistant method of communicating digital information comprising the steps of:
   a) transmitting encoded message bits in a radio-frequency (RF) signal;
   b) sensing the transmitted RF signal with a plurality of N antennae;
   c) for each sensed RF signal j where j indicates the receiving antenna, and j=1,2,3, .. N:
      i. down converting the sensed signal to a sampled baseband signal $r_j(n)$;
      ii. detecting a phase $\phi_j(n)$ for each sample $r_j(n)$,
      iii. estimating a signal to impairment (SIR) ratio $\hat{\gamma}^j$ from each detected phase $\phi_j(n)$,
      iv. calculating a weighting factor $F(\hat{\gamma})$ for post detection maximal ratio combining as a predetermined function of the jth signals estimated SIR $\hat{\gamma}^j$,
      v. determining the rectangular coordinates (cartesian coordinates) of a unit magnitude vector resulting in a cosine and sine of detected phase $\phi_j(n)$,
      vi. weighting both the sine and cosine of detected phase $\phi_j(n)$ by the weighting factor $F(\hat{\gamma})$ to result in an in-phase component $I_j(n)$, and a quadrature-phase component $Q_j(n)$ for the signal sensed from antenna j;
   d) summing in-phase components $I_j(n)$ for all antennae j into a composite in-phase coefficient $I_c(n)$;
   e) summing quadrature-phase components $Q_j(n)$ for all antennae j into a composite quadrature-phase coefficient $Q_c(n)$;
   f) determining a composite phase $\phi_c(n)$ according to:

$$\phi_c(n) = \tan^{-1}\left\{ \frac{Q_c(n)}{I_c(n)} \right\};$$

g) estimating the most likely message bits corresponding to the observed composite phase $\phi_c(n)$; and
   h) providing the estimated message bits to an output device capable of utilizing the digital information.

2. The fade-resistant method of claim 1 wherein the SIR weighting factor $F(\hat{\gamma})$ is a monotonically increasing function.

3. The fade-resistant method of claim 1 wherein the SIR weighting factor $F(\hat{\gamma})$ is defined as:

$$F(\hat{\gamma}) = \hat{\gamma}.$$

4. The fade-resistant method of claim 1 wherein the SIR weighting factor $F(\hat{\gamma})$ is defined as:

$$F(\hat{\gamma}) = \sqrt{\hat{\gamma}}.$$

5. The fade-resistant method of claim 1 further including, after the step of calculating the weighting factor $F(\hat{\gamma})$, the step of filtering the weighting factor $F(\hat{\gamma})$ with a metric filter according to:

$$F(\hat{\gamma}^j_{ave}(n)) = \sum_{i=n-L+1}^{n} h(i-n+L-1) F(\hat{\gamma}^j(i))$$

where h(i) are coefficients of the impulse response of the metric filter and L is the length of the impulse response in symbol intervals, chosen to be the average fade duration of the channel and employing the filtered weighting factor $F(\hat{\gamma}^j_{ave}(n))$ in subsequent steps in place of the weighting factor $F(\hat{\gamma})$.

6. The fade-resistant method of claim 1 wherein the SIR, $\hat{\gamma}$, is estimated according to:

$$\hat{\gamma}^j = \frac{1}{2\sin^2(\theta(n) - \phi_j(n))}$$

where $\phi_j(n)$ is the instantaneous phase of the signal received by antenna j at time t=nT;

T is the symbol period;

$$\theta(n) = \min_i \{\theta_i(n) - \phi_j(n)\}$$

$\theta_i(n)$ is a phase angle from the set of possible symbol constellation phase points (angles) transmitted $\{\theta\}$ that minimizes the absolute difference between $\theta_i(n)$ and $\phi_j(n)$.

7. The fade-resistant method of claim 1 wherein the SIR, $\hat{\gamma}$, is estimated according to:

$$\hat{\gamma}^j = \frac{1}{2\sin^2(\Delta\theta(n) - \Delta\phi_j(n))}$$

where $\Delta\theta(n) = \theta(n) - \theta(n-1)$; and $\Delta\phi_j(n) = \phi_j(n) - \phi_j(n-1)$ where $\phi_j(n)$, $\phi_j(n-1)$ are the instantaneous phase of the signal received by antenna j at time t=nT, and t=(n-1)T respectively;

T is the symbol period;

$$\theta(n-1) = \min_i \{\theta_i(n-1) - \phi_j(n-1)\}$$

$\theta_i(n)$, $\theta_i(n-1)$ are the phase angles from the set of possible symbol constellation phase points (angles) transmitted $\{\theta\}$ that minimizes the absolute difference between $\theta_i(n)$ and $\phi_j(n)$ and $\theta_i(n-i)$ and $\phi_j(n-1)$, respectively.

8. A simplified fade-resistant digital communications system comprising:
   a) a digital information source adapted for providing a stream of message bits;
   b) a transmitter means adapted for encoding and transmitting the message bits in a radio-frequency (RF) signal;
   c) a plurality of N receiver branches each adapted for receiving the transmitted RF signal wherein each receiver branch comprises:
      i. an antenna adapted for sensing the transmitted RF signal;
      ii. a front end unit coupled to the antenna for down converting each sensed signal to a sampled baseband signal, $r_j(n)$, iii. a phase detector coupled to the front end unit for detecting a phase $\phi_j(n)$ for each sample $r_j(n)$, iv. signal-to-impairment ratio (SIR) estimator coupled to the phase detector for estimating an SIR $\hat{\gamma}^j$ from each detected phase $\phi_j(n)$, v. a combining weight computation element coupled to the SIR ratio estimator adapted for weighting each SIR $\hat{\gamma}^j$ by a predetermined amount to result in a weighting factor $F(\hat{\gamma}^j)$, vi. vector converter coupled to the phase detector adapted for determining a unit magnitude vector having components defined as the cosine and sine of detected phase $\phi_j(n)$, vii. a first signal multiplier coupled to the vector converter for weighting the sine component of detected phase $\phi_j(n)$ by the weighting factor $F(\hat{\gamma}^j)$ to result in an in-phase component $I_j(n)$, and viii. a second signal multiplier coupled to the vector convertor for weighting the cosine component of detected phase $\phi_j(n)$ by the weighting factor $F(\hat{\gamma}^j)$ to result in a quadrature phase component $Q_j(n)$ for the signal sensed from antenna j;

d) an in-phase summer adapted for combining all in-phase components $I_j(n)$ for all antennae j into a composite in phase coefficient $I_c(n)$;

e) a quadrature phase summer adapted for combining all quadrature-phase components $Q_j(n)$ for all antennae j into a composite quadruture-phase coefficient $Q_c(n)$;

f) an inverse tangent unit coupled to the summers for determining a composite phase $\phi_c(n)$ according to:

$$\phi_c(n) = \text{Tan}^{-1}\left\{\frac{Q_c(n)}{I_c(n)}\right\}$$

g) a decision device coupled to the inverse tangent unit for converting $\phi_c(n)$ into message bits; and h) an output device coupled to the decision device for utilizing the message bits.

9. The simplified fade-resistant digital communications system as recited in claim 8 wherein the combining weight computation element is adapted to determine the weighting factor $F(\hat{\gamma}^j)$ according to a monotonically increasing function.

10. The simplified fade-resistant digital communications system as recited in claim 8 wherein the combining weight computation element is adapted to determine the weighting factor $F(\hat{\gamma}^j)$ according to the following equation:

$$F(\hat{\gamma}^j) = \hat{\gamma}^j.$$

11. The simplified fade-resistant digital communications system as recited in claim 8 wherein the combining weight computation element is adapted to determine the weighting factor $F(\hat{\gamma}^j)$ according to the following equation:

$$F(\hat{\gamma}^j) = \sqrt{\hat{\gamma}^j}.$$

* * * * *